Dec. 19, 1967     J. EHRLICH     3,358,526
VARIABLE RATIO TRANSMISSION GEARING
Filed Aug. 6, 1965     4 Sheets-Sheet 2

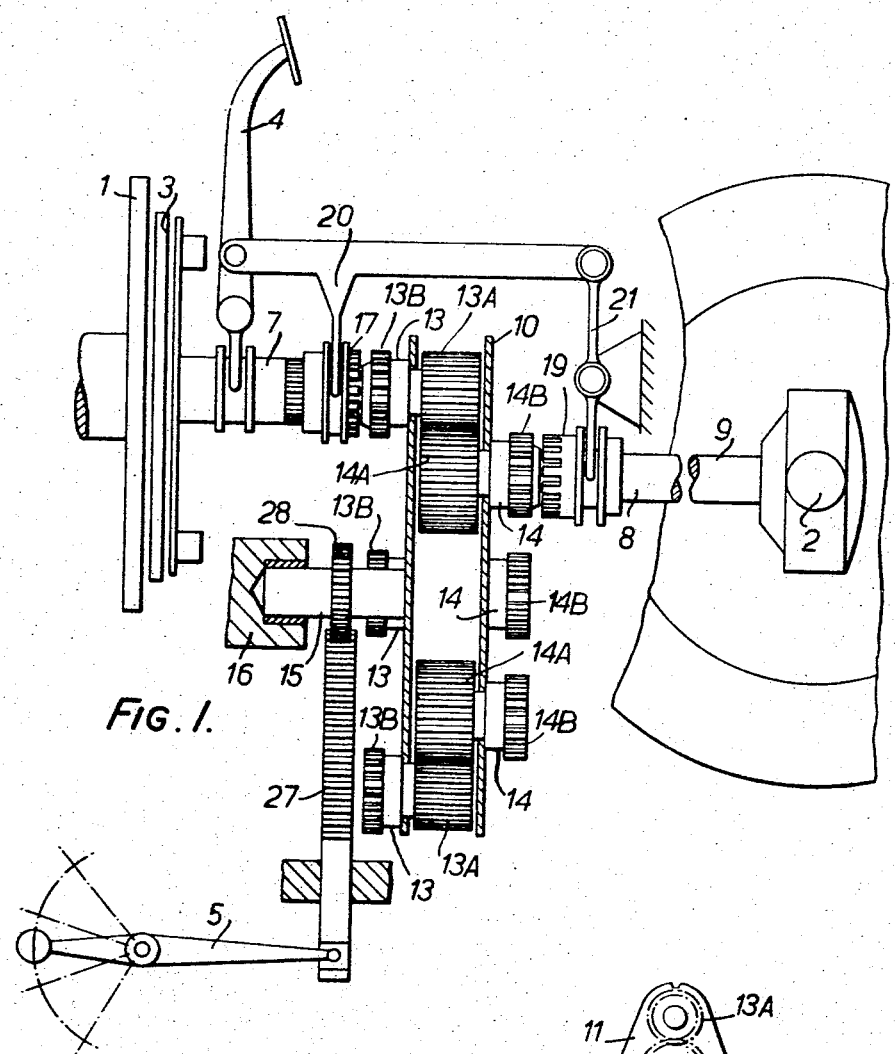
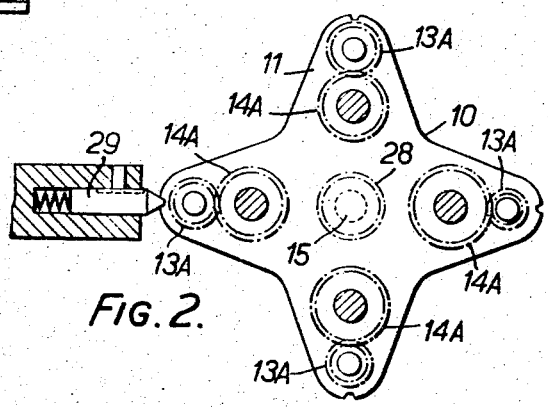
FIG. 1.
FIG. 2.
INVENTOR
JOSEPH EHRLICH

INVENTOR
JOSEPH EHRLICH

Dec. 19, 1967          J. EHRLICH          3,358,526
VARIABLE RATIO TRANSMISSION GEARING
Filed Aug. 6, 1965          4 Sheets-Sheet 4

INVENTOR
JOSEPH EHRLICH

United States Patent Office 3,358,526
Patented Dec. 19, 1967

3,358,526
VARIABLE RATIO TRANSMISSION GEARING
Josef Ehrlich, London, England, assignor to Bristol Siddeley Ehrlich Engineering Limited, Bristol, England
Filed Aug. 6, 1965, Ser. No. 477,882
Claims priority, application Great Britain, Aug. 6, 1964, 32,076/64
13 Claims. (Cl. 74—352)

ABSTRACT OF THE DISCLOSURE

Variable ratio transmission gearing having main driving and driven shafts and an intermediate carrier carrying gearing which by movement of the carrier can provide transmission paths of various ratio between the main driving and driven shafts.

Figure 3:
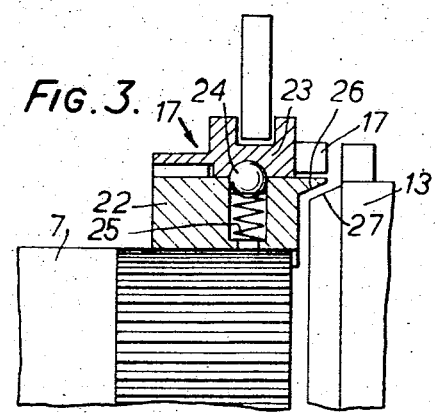

Variable ratio transmission gearing having non coaxial main driving and driven shafts and a carrier supporting two or more pairs of subsidiary driving and driven shafts each pair being interconnected by gearing providing a different ratio, the pairs of subsidiary driving and driven shafts being brought selectively into line with and connected by clutches to the main driving and driven shafts to provide different transmission ratios between the main driving and driven shafts.

---

This invention relates to variable ratio transmission gearing of the kind in which power is transmitted from a driving shaft to a driven shaft (hereinafter for convenience referred to as the main shafts) through gearing including two or more gear trains of different gear ratio which can be selectively brought into effective operation to transmit power from the driving to the driven shaft and has as its object to provide an improved form of variable ratio transmission gearing of this kind, which while being simple in construction and operation will avoid the disadvantage present in most forms of variable ratio transmission gearing of the kind in question, that the gears not actually transmitting power at any moment are nevertheless maintained in rotation, thus producing unnecessary wear, noise and frictional losses from the operation of the gearing not actually transmitting power, and from the fact that such operation is usually in an oil bath.

For convenience herein the term gearing is used in its widest sense to include not only gearing of the kind employing intermeshing toothed gear wheels but of the kind employing driving chains connecting sprockets or the equivalent on parallel shafts.

Variable ratio transmission gearing according to the present invention comprises main driving and driven shafts the axes of which are displaced from one another, a series of separate transmission trains each mounted in movable carrier means and each comprising a pair of shafts, constituting subsidiary driving and driven shafts, which are directly connected to one another by gearing providing a transmission ratio different from that provided by the gearing connecting the other pairs of subsidiary driving and driven shafts, and are rotatable independently of such other pairs of subsidiary driving and driven shafts, the axes of each pair of subsidiary driving and driven shafts being in the same positions relatively to one another as are the axes of the main driving and driven shafts, and the arrangement being such that the carrier means can be moved to bring the pairs of subsidiary driving and driven shafts selectively into an operative position in which the selected pair of subsidiary driving and driven shafts are coaxial respectively with the main driving and driven shafts, and clutch mechanism whereby such selected pair of subsidiary driving and driven shafts can then be connected respectively to the main driving and driven shafts.

The term "directly connected" is used herein as applied to each pair of shafts as meaning connected without the interposition of a layshaft.

In one form of the invention the axes of the main driving and driven shafts may be parallel to one another but displaced from one another, while in another form of the invention the axes of the main driving and driven shafts may be inclined to one another. In either case the gearing connecting at least two of the pairs of subsidiary driving and driven shafts preferably comprises two gear wheels secured respectively to the subsidiary driving and driven shafts and meshing directly with one another. In the case where the axes of the main driving and driven shafts are parallel to one another the gearing connecting at least one of the pairs of subsidiary driving and driven shafts may alternatively comprise a transmission chain connecting sprocket or like wheels secured respectively to the two shafts.

In one form of the invention in addition to the pairs of subsidiary driving and driven shafts referred to, there may also be provided a pair of "reverse gear" transmission shafts which are also mounted in carrier means with their axes in the same position relatively to one another as are the axes of the main driving and driven shafts and capable of being brought by movement of the carrier means into alignment with the axes of the main driving and driven shafts whereupon such pair of "reverse gear" transmission shafts can be connected by the clutch means to the main driving and driven shafts, such pair of "reverse gear" transmission shafts being connected to one another by gearing such that, whereas when any one of the other pairs of subsidiary driving and driven shafts is in operation the main driven shafts will be driven in a "forward" direction, when the said pair of "reverse gear" transmission shafts is in operation the main driven shaft will be driven in the "reverse" direction.

In another form of the invention, in addition to the pairs of subsidiary driving and driven shafts connected by transmission chains there is provided an additional pair of subsidiary transmission shafts mounted in carrier means with their axes in the same positions relatively to one another as those of the main driving and driven shafts and capable of being brought into alignment with the axes of the main driving and driven shafts by movement of the carrier means whereupon said additional pair of subsidiary transmission shafts can be directly connected to the main driving and driven shafts, such additional pair of subsidiary transmission shafts being connected to one another by gearing which when in operation causes the two shafts of the pair to rotate in opposite directions.

The carrier means may comprise single carrier member arranged to be rotatable about an axis displaced from the axes of the main driving and driven shafts and of the subsidiary driving and diven shafts, for the purpose of bringing the pairs of subsidiary driving and driven shafts selectively into alignment with those of the main driving and driven shafts.

The carrier means may alternatively comprise a movable supporting member and a series of transmission units carried by the supporting member and each including one of the pairs of subsidiary driving and driven shafts and the transmission gearing directly connecting such shafts, the supporting member being arranged to slide in a direction transverse to the axes of the main driving and driven shafts to bring the subsidiary pairs of driving and driven shafts selectively into line with the main driving and driven shafts. The transmission units are preferably detachably connected to the supporting member.

In a further form of the invention the carrier means may comprise a series of independent carrier members in the form of units each having mounted therein one of the pairs of subsidiary driving and driven shafts and the transmission gearing connecting such pair of subsidiary driving and driven shafts, the units being movably supported in guide means so as to be capable of being brought selectively into the operating position.

Figure 4:
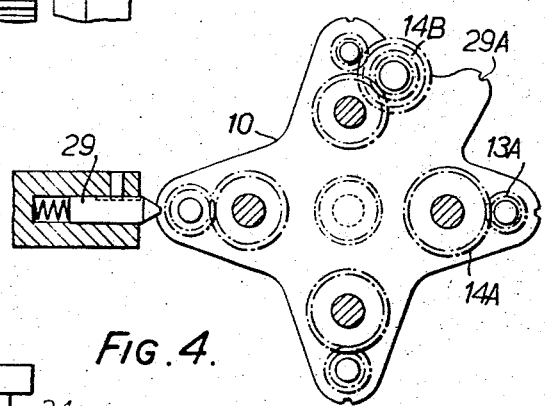
Figure 5:
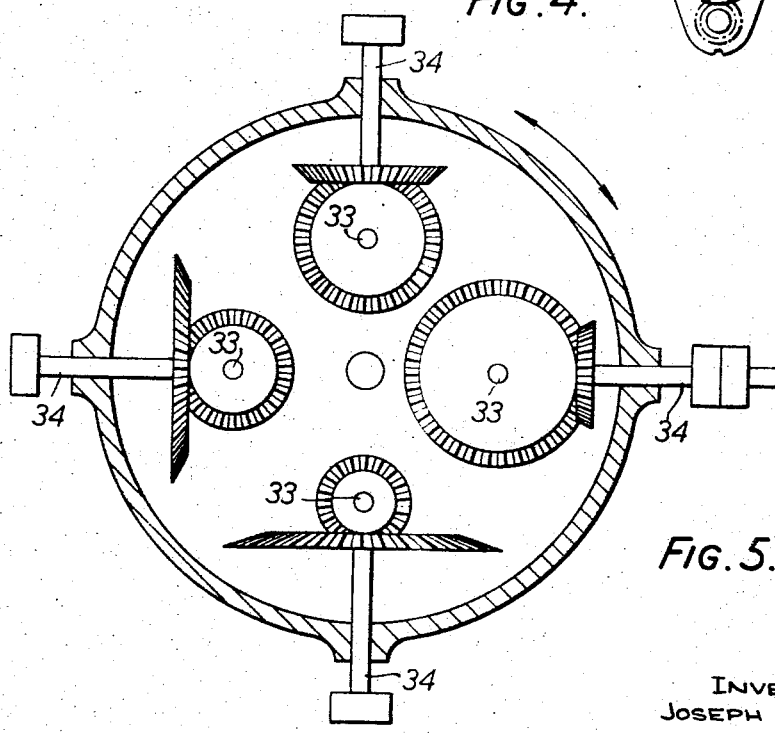
Figure 6:
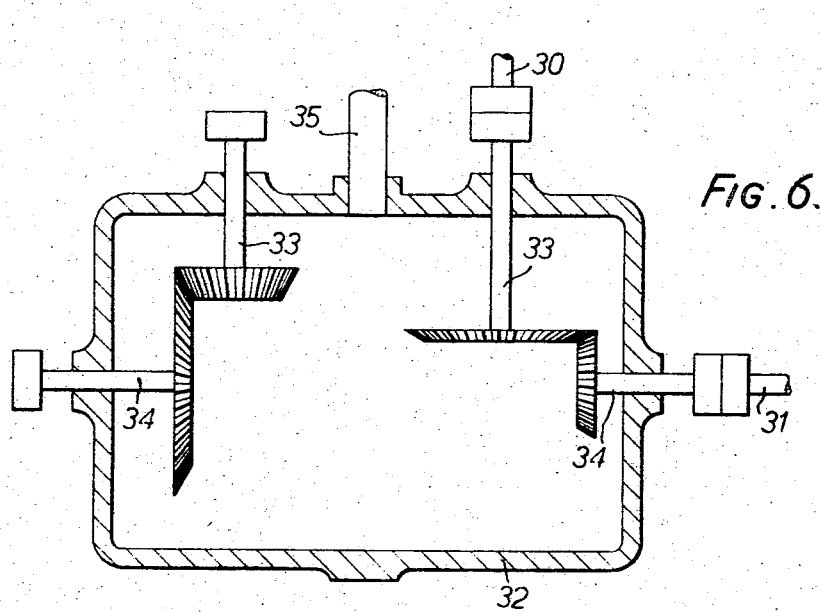
Figure 7:
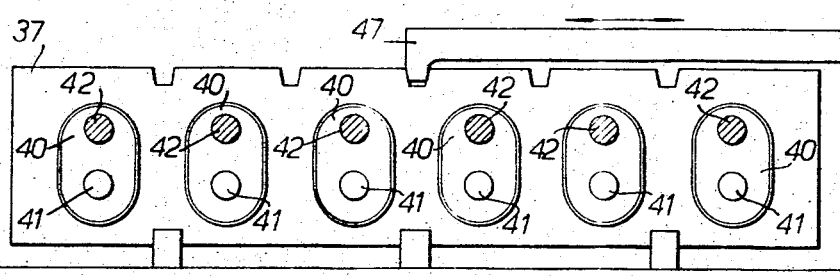
Figure 8:
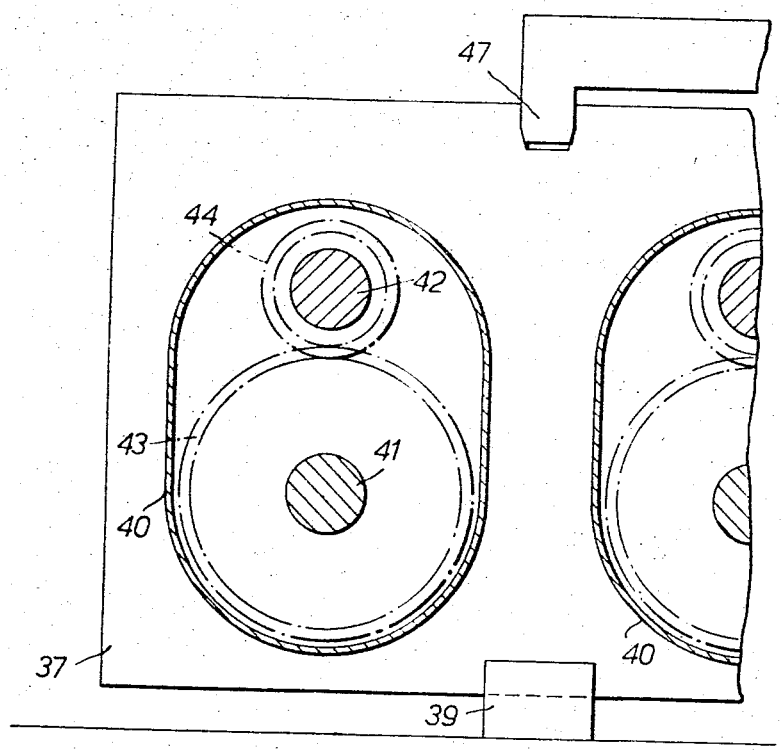
Figure 9:
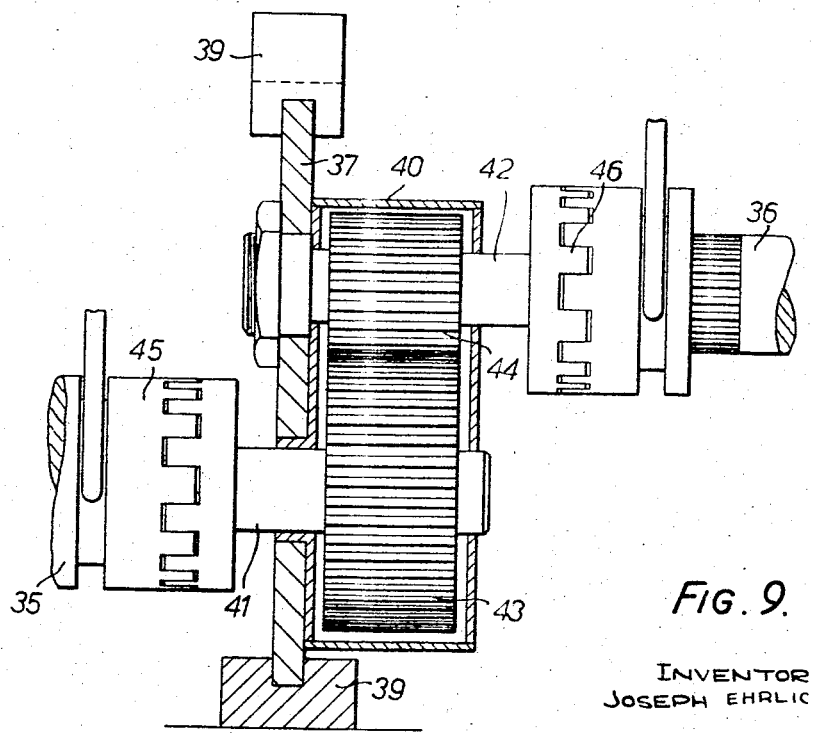

Three forms of variable ratio transmission gearing according to the invention and modification of one of such forms are shown diagrammatically by way of example in the accompanying drawings in which:

FIGURE 1 is a side elevation of one form of transmission gearing according to the invention together with control mechanism therefor, FIGURE 2 is an end view of the carrier and associated pairs of intermediate shafts embodied in the gearing shown in FIGURE 1, FIGURE 3 is a detailed view partly in cross section showing a form of synchronizing and dog clutch mechanism which may be employed in the construction shown in FIGURE 1, FIGURE 4 is a similar view to FIGURE 2 of the modification referred to above, FIGURES 5 and 6 are respectively a diagrammatic end view and a diagrammatic plan of a further construction of variable ratio gearing according to the invention, FIGURE 7 is a somewhat diagrammatic end view of the part of an alternative form of variable ratio transmission mechanism according to the invention comprising a carrier and certain associated parts, FIGURE 8 is an enlarged view of one end of the carrier shown in FIGURE 7, and FIGURE 9 is a sectional side elevation through the variable ratio transmission gearing having a carrier as shown in FIGURES 7 and 8 in a plane containing the axes of the driving and driven shafts.

In the construction shown in FIGURES 1, 2 and 3 the variable ratio transmission gearing is assumed to be included in complete transmission mechanism interposed between the flywheel 1 of an internal combustion engine and the differential gearing embodied in the back axle 2 of a motor vehicle, and including a clutch indicated at 3 arranged to be controlled in normal manner by a clutch pedal indicated at 4, while the transmission ratio is arranged to be controlled by a gear level indicated at 5 and assumed in this case to have 4 positions providing for 4 forward ratios.

The variable ratio transmission gearing comprises a driving shaft 7 and a driven shaft 8, having axes of rotation which are parallel to one another but displaced from one another, the driving shaft 7 being arranged to be connected by the clutch 3 to the flywheel 1 of the engine while the driven shaft 8 is permanently connected, via the normal transmission shaft 9, to the differential gearing incorporated in the back axle 2. Disposed between the adjacent ends of the driving and driven shafts 7 and 8 is a carrier 10 comprising a pair of supporting plates 11 rigidly connected to one another and having supported in bearings therein pairs of intermediate shafts, the intermediate shafts 13, 14 of each pair being connected by gearing as shown at 13A and 14A with the ratio of the gearing being different for each pair of intermediate shafts while the axes of rotation of the two intermediate shafts constituting each pair are parallel to and displaced from one another by the same distance as the axes of rotation of the driving and driven shafts. The carrier is mounted for rotation about an axis 15 in a support indicated generally at 16, in such manner that the axes of rotation of the two intermediate shafts 13, 14 constituting any selected pair of intermediate shafts can be brought into alignment with the axes of rotation respectively of the driving and driven shafts 7 and 8.

Each of the intermediate shafts 13 has rigidly mounted thereon one part 13B of a dog clutch the other part of which, 17, is mounted to slide on splines on the driving shaft 7 while each of the intermediate shafts 14 has rigidly mounted thereon one part 14B of a dog clutch of which the other part, 19, is mounted to slide on splines on the driven shaft 8, the arrangement being such, as shown, that, when the two intermediate shafts 13 and 14 constituting any one pair of any such intermediate shafts have been brought into axial alignment respectively with the driving and driven shafts 7 and 8 the movable members 17 and 19 of the dog clutch can be moved to engage their respective co-operating fixed members 13B and 14B so that the driving shaft 7 is connected to the appropriate intermediate shaft 13 and the driven shaft 8 is connected to the appropriate intermediate shaft 14.

The movement of the movable members 17 and 19 of the dog clutches is effected by mechanism indicated generally at 20, 21 connected to the clutch pedal 4 so that on disengagement of the main friction clutch 3 the dog clutches are also disengaged whereas upon movement of the clutch pedal towards its engaged position it first engages the dog clutches and then re-engages the main friction clutch 3.

Synchronizing mechanism is associated with each of the dog clutches, this synchronizing mechanism being for example of the known type indicated in FIGURE 3 as applied to the driving shaft 7, and comprising an inner sleeve 22 which is splined to the shaft 7, an outer sleeve 23 constituting the movable member of the dog clutch proper and slidable upon but non-rotatable relatively to the inner sleeve 22, such sliding movement relatively to the inner sleeve being resisted, when the clutch is disengaged, by a ball 24 acted upon by a spring 25 and urged into a part spherical recess in the outer sleeve 23. The inner sleeve 22 is provided with a frusto-conical friction surface 26 formed for engagement with a frusto-conical friction surface 27 on whichever of the intermediate shafts 13 is at any moment in alignment with the driving shaft 7, all so that when upon movement of the clutch pedal 4 from its disengaged position towards its engaged position the outer sleeve 23 is moved to the right, it first carries with it the inner sleeve 22 until the co-operating frusto-conical friction surfaces 23 and 27 engage to bring the appropriate intermediate shaft 13 into synchronism with the driving shaft 7 after which the ball 24 is pressed inwards against the spring 25 by the axial load exerted on the outer sleeve 23 and engagement of the movable and fixed parts of the dog clutch takes place all in a manner generally known in synchronizing mechanism.

It will be understood that the member 19 and each of the members 14 will be constructed and arranged in a similar manner to the members 17 and 13 in FIGURE 3 to synchronise the shaft 8 and any selected intermediate shaft 14.

The carrier 10 is arranged to be moved rotationally into any one of the appropriate selected positions by means of a rack 27 engaging a gear wheel 28 fixed to the carrier, while indexing mechanism, for example in the form of a spring pressed pin 29 is provided to hold the carrier against unintentional movement from any selected position and provide a retaining force which will indicate to an operator actuating the ratio control lever 5 when the carrier is in any one of the selected positions.

Interlocking or stop mechanism may be provided by which movement of the clutch pedal 4 from its disengaged into its engaged position cannot take place except when the carrier 10 is in one or other of the selected positions.

In the modification shown in FIGURE 4 the construction may be assumed to be the same as that described with reference to FIGURES 1 to 3 except that one pair of intermediate shafts is connected through an intermediate gear as indicated at 14B to provide a reverse ratio while there is an indexing notch 29A in the carrier to provide a "neutral" position.

In the modified arrangement shown diagrammatically in FIGURES 4 and 5 the driving shaft is indicated at 30 and the driven shaft at 31 while a carrier 32 has mounted there in pairs of intermediate shafts connected by bevelled gearing as shown at 33, 34 and is rotatable about an axis 35 in such a manner that any one of the selected shafts 33 can be brought into alignment with the driving shaft 30 simultaneously with the bringing into alignment of the associated shaft 34 with the driven shaft 31. Synchronizing and dog clutch mechanism may be assumed to be associated with the driving and driven shafts 30 and 31 to enable them to be synchronized with and then directly connected to the intermediate shafts with which they are thus brought into alignment in a similar manner to that in which the driving and driven shafts are connected to the intermediate shafts in the construction shown in FIGURE 1.

In the construction diagrammatically shown in FIGURES 7, 8 and 9 the transmission gearing comprises driving and driven shafts 35, 36 having parallel axes displaced from one another and a carrier comprising a carrier plate 37 mounted to slide transversely of said axes in guides 39 and having connected thereto a series of individual casings 40 each carrying, in conjunction with the carrier plates 37, a pair of layshafts 41, 42 connected by gearing 43, 44 and projecting respectively in opposite directions from the carrier, the axes of each pair of layshafts 41, 42 being parallel and displaced by the same distance as the axes of the driving and driven shafts 35, 36 and the arrangement being such that, by sliding the carrier plate 37, laterally, the intermediate shafts 41, 42 constituting any selected pair can be brought into alignment respectively with the driving and driven shafts 35 and 36 and then connected thereto by dog clutches indicated at 45 and 46 which may have associated with them synchronising mechanism, the arrangement being, for example, substantially similar to that employed for connecting the intermediate shafts 13 and 14 to the main shafts 7 and 8 in the construction shown in FIGURE 1.

It will be understood that the gearing in the individual casings 40 will be of different ratio and that one of such casings may include a reversing gear. An indexing device for retaining the carrier plate 37 in any selected position until released is shown at 47.

What I claim as my invention and desire to secure by Letters Patent is:

1. Variable ratio transmission gearing comprising main driving and driven shafts the axes of which are displaced from one another, movable carrier means, a series of separate transmission trains each mounted in said movable carrier means and each comprising a pair of shafts, constituting subsidiary driving and driven shafts, which are directly connected to one another by gearing providing a transmission ratio different from that provided by the gearing connecting the other pairs of subsidiary driving and driven shafts, and are rotatable independently of such other pairs of subsidiary driving and driven shafts, the axes of each pair of subsidiary driving and driven shafts being in the same positions relatively to one another as are the axes of the main driving and driven shafts, and the arrangement being such that the carrier means can be moved to bring the pairs of subsidiary driving and driven shafts selectively into an operative position in which the selected pair of subsidiary driving and driven shafts are coaxial respectively with the main driving and driven shafts, and clutch mechanism whereby such selected pair of subsidiary driving and driven shafts can then be connected respectively to the main driving and driven shafts.

2. Variable ratio transmission gearing as claimed in claim 1 in which the axes of the main driving and driven shafts are parallel to one another but displaced from one another.

3. Variable ratio transmission gearing as claimed in claim 1 in which the axes of the main driving and driven shafts are inclined to one another.

4. Variable ratio transmission gearing as claimed in claim 1 in which the gearing connecting at least two of the pairs of subsidiary driving and driven shafts comprises two gear wheels secured respectively to the subsidiary driving and driven shafts and meshing directly with one another.

5. Variable ratio transmission geariing as claimed in claim 4 including, in addition to the pairs of subsidiary driving and driven shafts referred to, a pair of "reverse gear" transmission shafts which are also mounted in carrier means with their axes in the same positions relatively to one another as are the axes of the main driving and driven shafts and capable of being brought by movement of the carrier means into alignment with the axes of the main driving and driven shafts whereupon such pair of "reverse gear" transmission shafts can be connected by the clutch means to the main driving and driven shafts, such pair of "reverse gear" transmission shafts being connected to one another by gearing such that, whereas when any one of the other pairs of subsidiary driving and driven shafts is in operation the main driven shaft will be driven in a "forward" direction, when the said pair of "reverse gear" transmission shafts is in operation the main driven shaft will be driven in the "reverse" direction.

6. Variable ratio transmission gearing as claimed in claim 1 in which the carrier means comprises a single carrier member arranged to be rotatable about an axis displaced from the axes of the main driving and driven shafts and of the subsidiary driving and driven shafts, for the purpose of bringing the pairs of subsidiary driving and driven shafts selectively into alignment with those of the main driving and driven shafts.

7. Variable ratio transmission gearing as claimed in claim 1 in which the carrier means comprise a movable supporting member and a series of transmission units carried by the supporting member and each including one of the pairs of subsidiary driving and driven shafts and the transmission gearing directly connecting such shafts, the supporting member being arranged to slide in a direction transverse to the axes of the main driving and driven shafts to bring the subsidiary pairs of driving and driven shafts selectively into line with the main driving and driven shafts.

8. Variable ratio transmission gearing as claimed in claim 7 in which the transmission units are detachably connected to the supporting member.

9. Variable ratio transmission gearing as claimed in claim 1 in which the carrier means comprises a series of independent carrier members in the form of units each having mounted therein one of the pairs of subsidiary driving and driven shafts and the transmission gearing connecting such pair of subsidiary driving and driven shafts, the units being movably supported in guide means so as to be capable of being brought selectively into the operative position.

10. Variable ratio transmission gearing as claimed in claim 2 in which the gearing connecting at least two of the pairs of subsidiary driving and driven shafts comprises two gear wheels secured respectively to the subsidiary driving and driven shafts and meshing directly with one another.

11. Variable ratio transmission gearing as claimed in claim 7 in which the carrier means comprises a movable supporting member and a series of transmission units carried by the supporting member and each including one of the pairs of subsidiary driving and driven shafts and the transmission gearing connecting such shafts, the supporting member being arranged to slide in a direction transverse to the axes of the main driving and driven shafts to bring the subsidiary pairs of driving and driven shafts selectively into line with the main driving and driven shafts.

12. Variable ratio transmission gearing as claimed in claim 11 in which the transmission units are detachably connected to the supporting member.

13. Variable ratio transmission gearing as claimed in claim 11 in which the carrier means comprises a series of independent carrier members in the form of units each having mounted therein one of the pairs of subsidiary driving and driven shafts and the transmission gearing connecting such pair of subsidiary driving and driven shafts, the units being movably supported in guide means so as to be capable of being brought selectively into the operative position.

References Cited
UNITED STATES PATENTS

| | | | |
|---|---|---|---|
| 418,281 | 12/1889 | Elliott | 74—354 |
| 1,614,062 | 1/1927 | Engler | 74—353 |
| 1,815,033 | 7/1931 | Boughton | 74—353 X |
| 2,469,743 | 5/1949 | Newton | 74—354 X |

FOREIGN PATENTS

| | | |
|---|---|---|
| 511,098 | 8/1939 | Great Britain. |

BENJAMIN W. WYCHE III, *Primary Examiner.*